United States Patent
Sabapathy et al.

(10) Patent No.: US 8,700,918 B2
(45) Date of Patent: Apr. 15, 2014

(54) DATA MASKING

(75) Inventors: Sundarraman Sabapathy, Hyderabad (IN); Apparao Kodavanti, Hyderabad (IN); Srinivas K. Adabala, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 5 days.

(21) Appl. No.: 13/453,404

(22) Filed: Apr. 23, 2012

(65) Prior Publication Data

US 2013/0283059 A1  Oct. 24, 2013

(51) Int. Cl.
*G06F 12/14* (2006.01)
(52) U.S. Cl.
USPC .......................................................... 713/189
(58) Field of Classification Search
None
See application file for complete search history.

(56) References Cited

U.S. PATENT DOCUMENTS

2002/0194476 A1* 12/2002 Lewis et al. .................... 713/169
2008/0276086 A9* 11/2008 Proudler ........................ 713/165

* cited by examiner

*Primary Examiner* — Brandon Hoffman

(57) ABSTRACT

Method, device, and storage medium to receive test data including multiple test strings, wherein the test data is a data set that includes all possible values of input strings to be data masked; encrypt each of the test strings; select a portion of the encrypted test string; compare each portion to the corresponding test string; determine, for each portion, whether the portion of is equal to the corresponding test string; assign the portion as a replacement string when the portion is not equal to the corresponding test string; determine whether each replacement string is unique; store each replacement string that is not unique; generate, for each replacement string that is not unique, an alternate replacement string; and output an alternate replacement string, as a masked string in response to a determination that art input string matches one of the stored test strings associated with one of the alternate replacement strings.

20 Claims, 11 Drawing Sheets

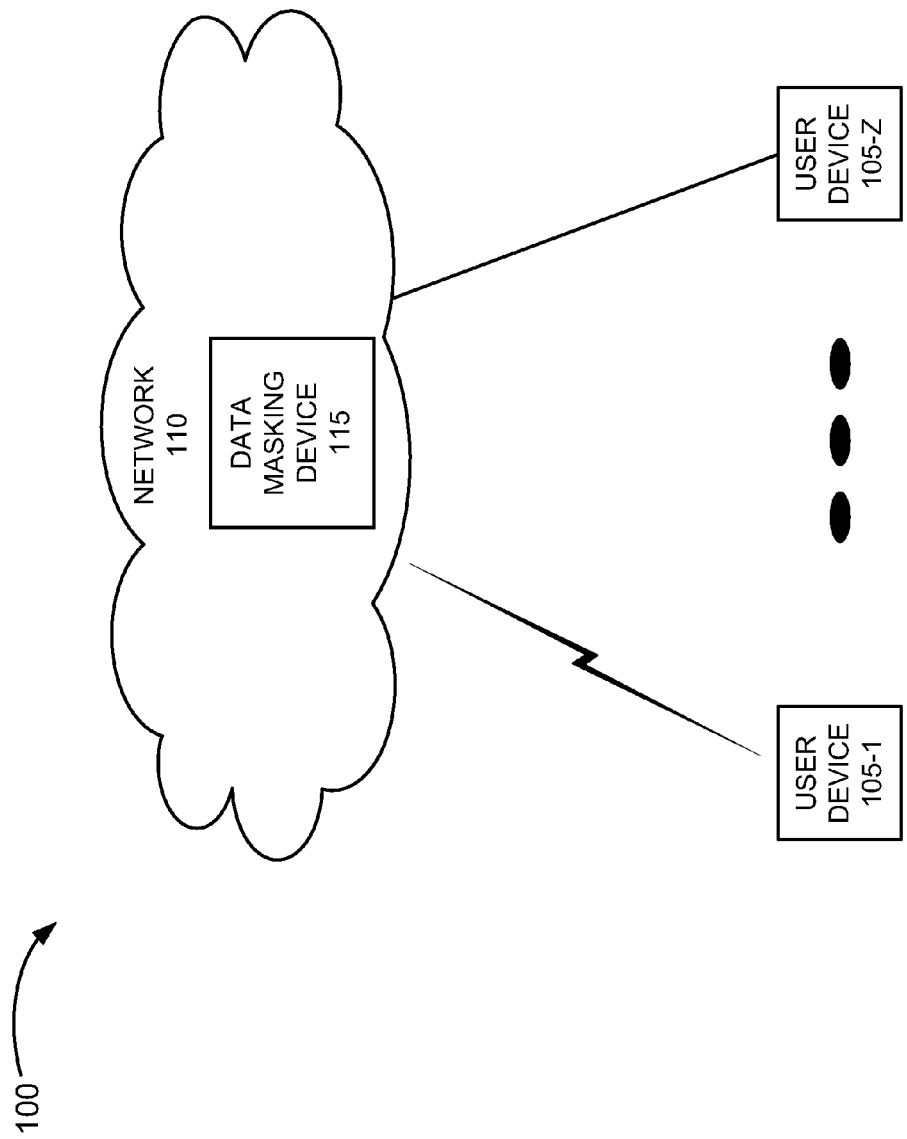

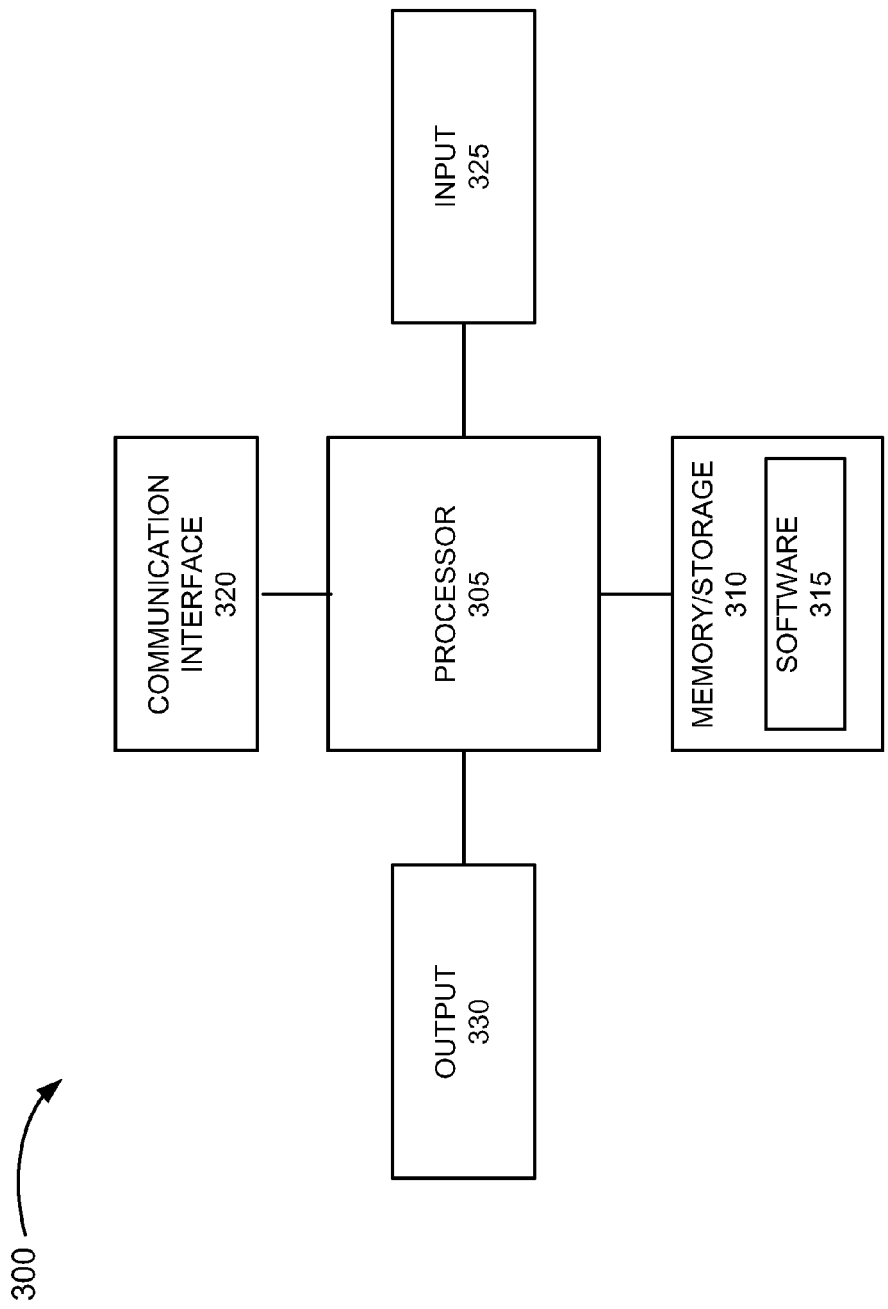

DATA MASKING

BACKGROUND

Data masking is a process that obscures data. There are various techniques used in the industry, such as encryption, substitution, shuffling, and number and data variance.

DESCRIPTION OF THE DRAWINGS

FIG. 1 is a diagram illustrating an exemplary environment in which an exemplary embodiment of data masking may be implemented;

FIG. 3 is a diagram illustrating exemplary components of a device that may correspond to one or more of the devices depicted in FIG. 1;

DETAILED DESCRIPTION

Figure 2A:
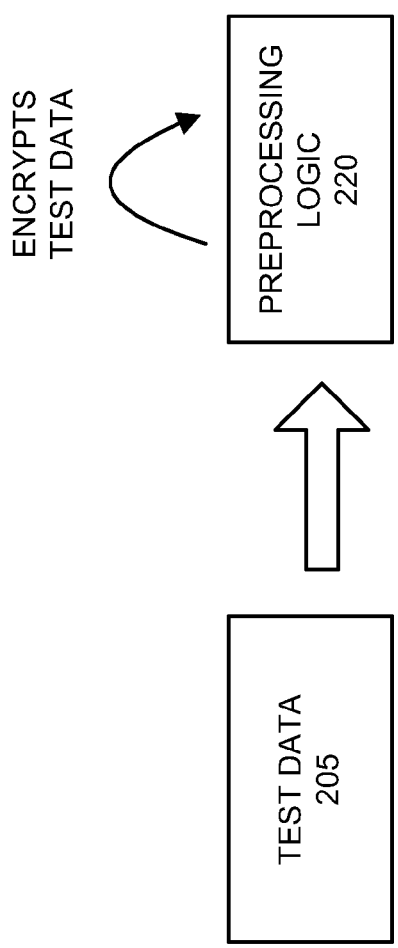
FIGS. 2A-2D are diagrams illustrating an exemplary process according to an exemplary embodiment of data masking.

The following detailed description refers to the accompanying drawings. The same reference numbers in different drawings may identify the same or similar elements.

According to an exemplary embodiment, a data masking process includes a preprocessing stage and a processing stage. According to an exemplary embodiment, the preprocessing stage identifies data that yield collisions. According to an exemplary embodiment, the preprocessing stage uses test data that includes all possible values of input data to be masked. By way of example, assume that the input data to be masked are social security numbers, which are represented by a nine-digit number (e.g., 011-55-3223). The test data may have any pre-defined maximum length and the length of the test data is independent of the length of the input data. For example, test data may have a length from one through eight and values ranging from 0-99999999. The test data includes values ranging from the lowest possible value of a social security number to a highest possible value for a social security number so as to accommodate any possible value of input data. In this way, the preprocessing stage may be performed once to ensure the identification of collisions.

According to an exemplary embodiment, the preprocessing stage calculates replacement data for test data that yield collisions and stores the collided test data and the replacement data.

According to an exemplary embodiment, the processing stage generates masked data for input data. According to an exemplary embodiment, the processing stage identifies input data that match the stored test data that yield collisions and uses their corresponding replacement data as the masked data. According to an exemplary embodiment, the processing stage generates masked data for the input data that do not match the stored test data. In this way, the data masking process provides, among other things, use of a limited amount of storage and avoids the cost, the security measures, and the complexities associated with storing and retrieving all masked data. In other words, a data masking process includes generating masked data (e.g., on-the-fly, during run-time, etc.) for input values that do not result in collision and uses replacement data as masked data for input values that do result in collision, as identified during the preprocessing stage.

The data masking process described herein provides, among other things, a maintenance of referential integrity (e.g., parent-child table relationships), a maintenance of input characteristics (e.g., length of the input data, data type of the input data, special characters are retained), and security (e.g., based on industry standard encryption used during the data masking process).

An embodiment of data masking, as described herein, may be implemented by a network device, by a user device, or a combination thereof.

FIG. 1 is a diagram illustrating an exemplary environment in which an exemplary embodiment of data masking may be implemented. As illustrated in FIG. 1, environment 100 includes user devices 105-1 through 105-X, in which X>1 (also referred to generally as user device 105 or user devices 105) and a network 110. Network 110 includes a data masking device 115.

The number of devices and networks, and the configuration in environment 100 are exemplary. According to other embodiments, environment 100 may include additional devices, fewer devices, different devices, and/or differently arranged devices, than those illustrated in FIG. 1. Additionally, or alternatively, environment 100 may include an additional network or may be implemented without a network.

According to other embodiments, a single device in FIG. 1 may be implemented as multiple devices and/or multiple devices may be implemented as a single device. By way of example, data masking device 115 may be implemented as multiple devices. Alternatively, for example, user device 105 may be combined with data masking device 115 into a single device.

A device may be implemented according to a centralized computing architecture or a distributed computing architecture. For example, data masking device 115 may be implemented according to a centralized or a distributed computing architecture. Additionally, a device may be implemented according to one or multiple network architectures (e.g., a client device, a server device, a peer device, or a combination thereof). For example, user device 105 may be implemented as a client device and data masking device 115 may be implemented as a server device. Additionally, for example, a device may be implemented as a stand-alone device. For example, data masking device 115 may be implemented as a stand-alone device. Furthermore, given the security issues related to data masking, a device that performs data masking may be secure to avoid intrusion by unwanted parties, data breaches, data compromises, etc.

Also, according to other embodiments, one or more functions and/or processes described as being performed by a particular device or logic may be performed by a different device or logic, or some combination of devices or logic, which may or may not include the particular device or logic.

Environment 100 may be implemented to include wired and/or wireless connections among the devices and network illustrated. A connection may be direct or indirect and may involve intermediary device(s) and/or network(s) not illustrated in FIG. 1.

User device 105 includes a device having the capability to communicate with another device, a network, a system, and/or the like. For example, user device 105 may be implemented as a computational device (e.g., a computer, etc.) or a terminal device.

Network 110 includes one or multiple networks. For example, network 110 may include a wireless network and/or a wired network. Network 110 allows user device 105 to communicate, directly or indirectly, with data masking network device 115.

Data masking device 115 includes a device having the capability to communicate with another device, a network, a system, and/or the like. For example, data masking device 115 may be implemented as a computational device (e.g., a computer, etc.). Data masking device 115 is capable of performing data masking according to an exemplary embodiment described herein.

FIGS. 2A-2D are diagrams illustrating an exemplary process according to an exemplary embodiment of data masking. The process is performed by data masking device 115. For example, data masking device 115 includes preprocessing logic 220 and processing logic 275.

Referring to FIG. 2A, test data 205 is provided to preprocessing logic 220. Test data 205 may include, for example, numerical data, alphabetic data, or alphanumeric data. According to an exemplary embodiment, test data 205 includes every possible value or range of input data. For example, test data 205 may include a range of values for possible birth dates (e.g., for persons under 150 years old), driver's license, account numbers, etc. According to such an embodiment, preprocessing logic 220 may perform the preprocessing process only one time. According to other embodiments, test data 205 may include data that does not encompass all possible values.

Preprocessing logic 220 identifies collisions with respect to test data 205. According to an exemplary embodiment, test data 205 is of the same length and data type as the input data. According to another embodiment, test data 205 may be of a parsed length of the input data. By way of example, assume that the input data is 100 characters in length. During the masking process described below, the input data may be parsed (e.g., into strings having a length of ten). According to this example, test data 205 may be a length of ten and have a data type corresponding to the parsed input data.

As illustrated in FIG. 2A, preprocessing logic 220 receives test data 205. Preprocessing logic 220 encrypts test data 205 using an encryption algorithm. For example, any well-known encryption algorithm may be used, such as an Advanced Encryption Standard (AES)-based algorithm (e.g., AES-256, etc.), or a proprietary encryption algorithm.

Figure 2B:
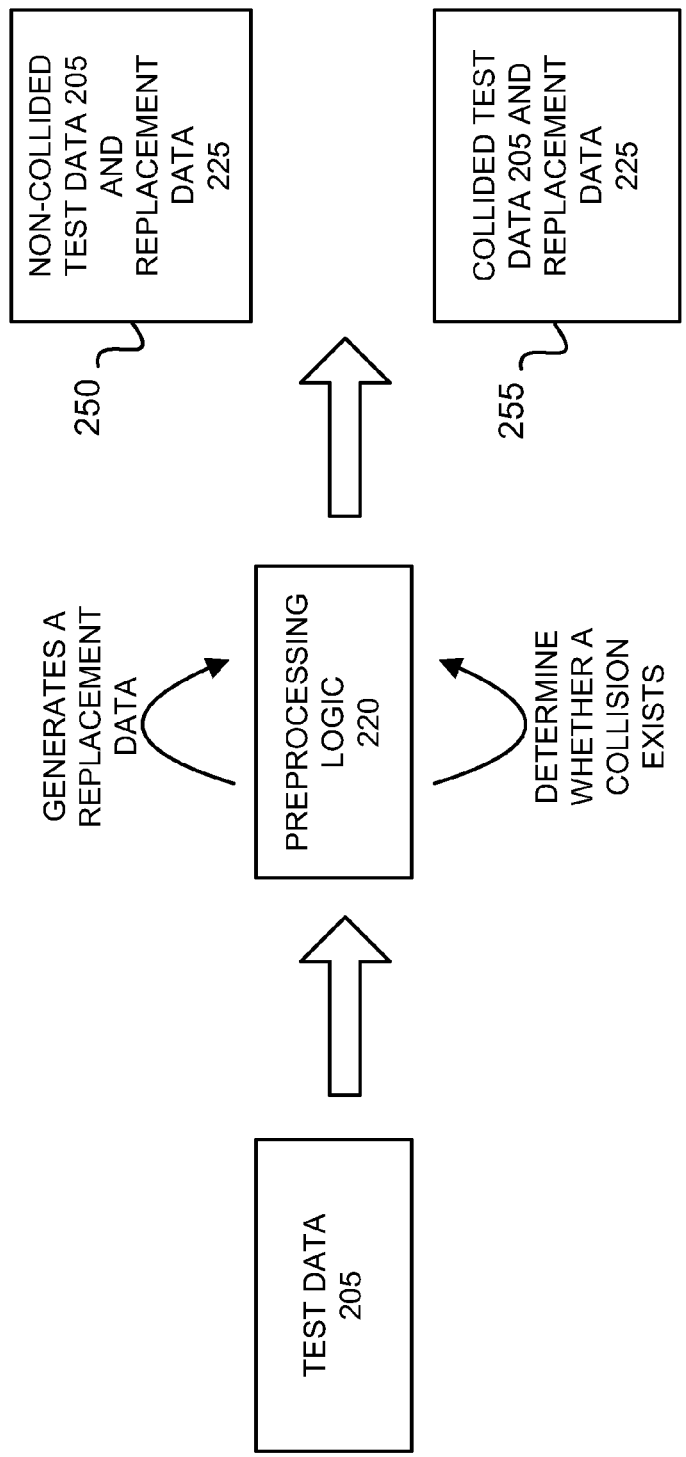

Referring to FIG. 2B, preprocessing logic 220 generates replacement data for the encrypted data. According to an exemplary embodiment, preprocessing logic 220 includes length reduction logic (not illustrated). The length reduction logic tokenizes the encrypted data, which is assumed to have a length greater than the test data 205, into a length equal to that of the test data 205. Preprocessing logic 220 compares the tokenized encrypted data to the test data 205. If the tokenized encrypted data and test data 205 are different, preprocessing logic selects the tokenized encrypted data, as replacement data, for test data 205. If the tokenized encrypted data and test data 205 are the same, length reduction logic tokenizes a different set of characters from the encrypted data. Preprocessing logic 220 compares the other tokenized encrypted data to test data 205. This process is repeated until the tokenized encrypted data and test data 205 are not the same.

According to an exemplary implementation, length reduction logic selects the set of characters that are serially positioned. For example, assume that the encrypted data is ten characters in length and the test data 205 has a length of eight characters. Length reduction logic tokenizes characters one through eight of the encrypted data. If the tokenized encrypted data and test data 205 are the same, length reduction logic may tokenize characters two through nine of the encrypted data, and so forth. According to another implementation, length reduction logic selects the set of characters from the encrypted data, which are not serially positioned. For example, according to the example described above, length reduction logic may select characters from the encrypted data having positions at one, three, four, five, seven, eight, nine, and ten, or some other positions.

As further illustrated in FIG. 2B, preprocessing logic 220 determines whether a collision exists. For example, preprocessing logic 220 compares the replacement data correlated to test data 205 to previously stored replacement data stemming from previous iterations of the preprocessing process, as applied to other test data 205. For example, during a first iteration, preprocessing logic 220 stores a first test data 205 and a first replacement data 225 in a non-collided test data and replacement data storage 250. For subsequent iterations, as applied to an "nth" test data 205, preprocessing logic 220 compares an "nth" replacement data 225 associated with the "nth" test data 205 to replacement data 225 stored in non-collided parsed input data and replacement data storage 250. If the "nth" replacement data 225 is not already stored, preprocessing logic 220 determines that a collision does not exist, and stores the "nth" test data 205 and the "nth" replacement data in non-collided test data and replacement data storage 250. If the "nth" replacement data 225 is already stored, then preprocessing logic 220 determines that a collision does exist, and stores the "nth" test data 205 and the "nth" replacement data 225 in a collided test data and replacement data storage 255.

Figure 2C:
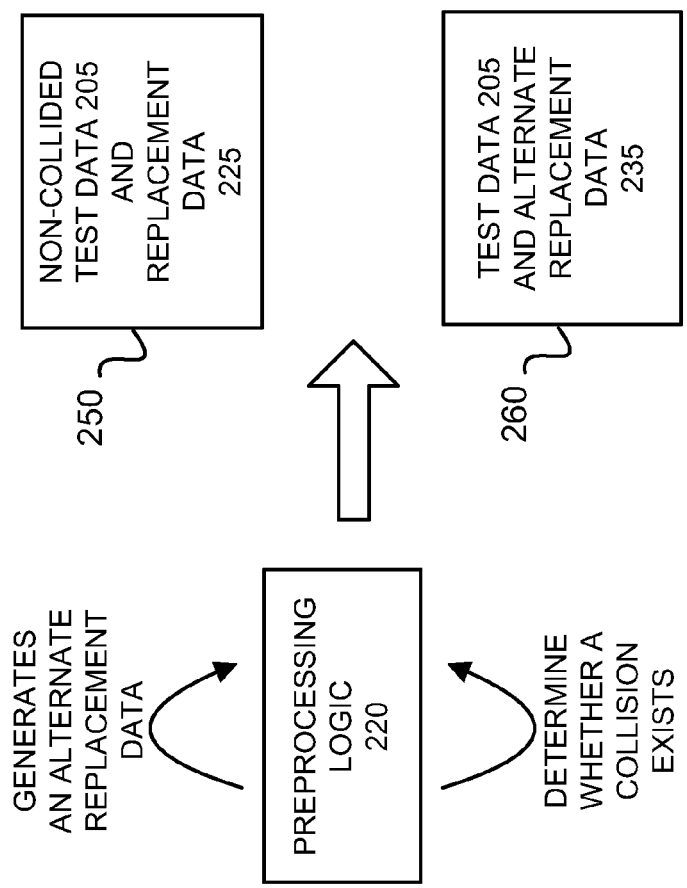

Referring to FIG. 2C, preprocessing logic 220 generates an alternate replacement data for each of the collided replacement data 225 stored in collided test data and replacement storage 255. According to an exemplary embodiment, preprocessing logic 220 determines whether the selected alternate replacement data results in a collision based on a comparison with replacement data 225 stored in non-collided test data and replacement data storage 250. If a collision does exist, preprocessing logic 220 generates another alternate replacement data, and so forth. If a collision does not exist, preprocessing logic 220 stores test data 205 and alternate replacement data 235 in collided test data and alternate replacement data storage 260. Preprocessing logic 220 may generate alternate replacement data based on various methods, which are described further below.

According to an exemplary implementation, preprocessing logic 220 deletes test data 205 and replacement data 225 stored in storage 250 and storage 255. As described further below, processing logic 275 generates masked data (e.g., on-the-fly) for input data that does not match the test data 205 stored in storage 260. In this regard, as previously described, a limited amount of storage is used (e.g., for a data masking process) and the cost, the security measures, and the complexities associated with storing and retrieving all masked data may be avoided, while maintaining referential integrity.

Figure 2D:
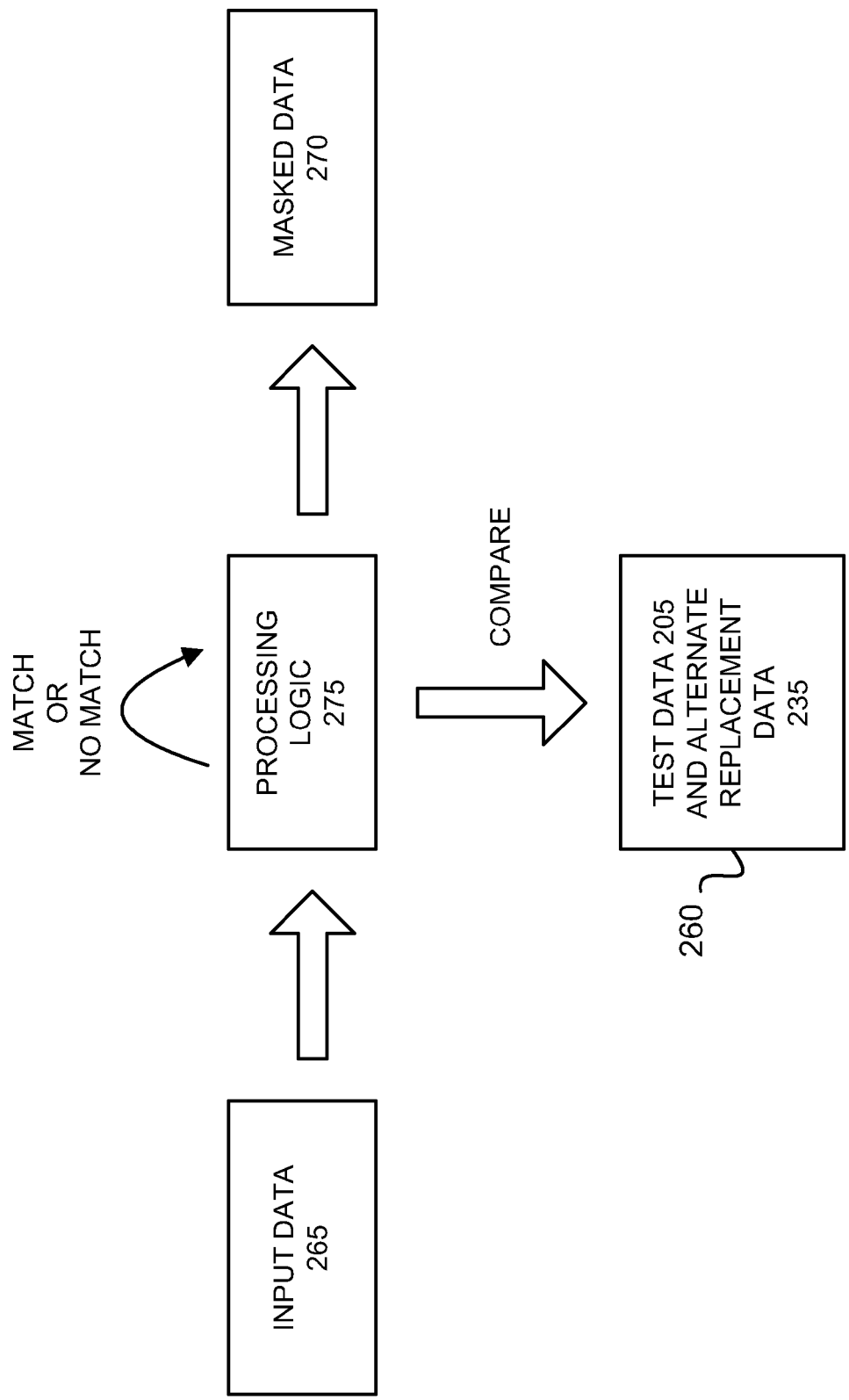

Referring to FIG. 2D, assume processing logic 275 receives a request for input data 265 that is to be masked. According to this example, it may be assumed that input data 265 is of a length that matches alternate replacement data 235. Additionally, according to this example, it may be assumed that input data 265 does not include any special characters. According to other examples, processing logic 275 may parse input data 265 to sub-strings having a length equal to that of alternate replacement data 235. Additionally, or alternatively, according to other examples, processing logic 275 may remove special characters from input data 265. For example, a special character may correspond to a punctuation mark (e.g., a hyphen, a period, etc.) a special symbol (e.g., an "@" sign, etc.), or another type of character that is not a number or a letter.

Processing logic 275 compares the input data 265 to the stored test data 205 correlated to alternate replacement data 235 stored in storage 260. If there is a match between input data 265 and one of the stored test data 205, processing logic 275 selects the alternate replacement data 235, which correlates to the test data 205, as a masked data 270 for input data 265. If there is not a match between input data 265 and any of the stored test data 205, processing logic 275 generates masked data 270 for input data 265. For example, according to an exemplary embodiment, processing logic 275 encrypts input data 265 and performs length reduction, as previously described. Processing logic 275 outputs the tokenized encrypted data as masked data 270. According to another embodiment, if there is not a match between input data 265 and one of the test data 205 stored in storage 260, processing logic 275 passes input data 265 to preprocessing logic 220 to generate masked data 270 (e.g., encrypts input data 265 and performs length reduction). Preprocessing logic 220 may pass the tokenized encrypted data to processing logic 275. Processing logic 275 outputs the tokenized encrypted data as masked data 270.

As previously described, according to other examples, input data 265 may need to be parsed. By way of example, assume that each instance of test data 205 includes a string having a length of eight characters. Additionally, assume that each instance of input data 265 includes a string having a length of sixteen characters. In other words, the length of test data 205 is configured to match the length of a parsed input data 265. According to an exemplary implementation, processing logic 275 may parse input data 265 in two strings, each having a length of eight characters. In this way, each parsed input data 265 has a length equal to each instance of test data 205. The process described above may then continue, as previously described, in which processing logic 275 determines whether a parsed input data 265 matches one of the test data 205 stored in storage 260. If there is a match, processing logic 275 uses alternate replacement data 235 as masked data 270. If there is not a match, processing logic 275 generates masked data 270. Since input data 265 is parsed, processing logic 275 performs a concatenation process so that masked data 270 is output as a string having a length of sixteen characters.

Additionally, as previously described, according to other examples, input data 265 may include special characters. By way of example, assume that test data 205 includes nine-digit length strings corresponding to all possible values of a social security number. Also assume, that when processing logic 275 receives input data 265, input data 265 includes hyphens (e.g., 011-45-2345). That is, processing logic 275 does not receive a pure numerical string having a length of nine. According to an exemplar, embodiment, processing logic 275 identifies the special characters (e.g., hyphens) included in input data 265 and removes the special characters from input data 265. Processing logic 275 stores position information pertaining to the removed special characters and stores the special characters. Processing logic 275 then uses input data 265, which no longer includes the special characters, to determine whether input data 265 matches one of the test data 205 stored in storage 260, etc. Processing logic 275 inserts the special characters back into masked data 270.

FIG. 3 is a diagram illustrating exemplary components of a device 300 that may correspond to one or more of the devices depicted in the previous figures. As illustrated, according to an exemplary embodiment, device 300 includes a processor 305, memory/storage 310, software 315, a communication interface 320, an input 325, and an output 330. According to other embodiments, device 300 may include fewer components, additional components, different components, and/or a different arrangement of components than those illustrated in FIG. 3 and described herein.

Processor 305 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 may include one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 may include an application or a program that provides a function and/or a process. Software 315 may include firmware. For example, software 315 may include a data masking algorithm, as described herein. Additionally, for example, software 315 may include an encryption algorithm.

Communication interface 320 may permit device 300 to communicate with other devices, networks, systems, etc. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 may permit an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 may permit an output from device 300. For example, output 330 may include a speaker, a display, a touchscreen, a touchless screen, a light, an output port, and/or some other type of visual, auditory, tactile, etc., output component.

Device 300 may perform processes and/or functions, as described herein, in response to processor 305 executing software 315 stored by memory/storage 310. By way of example, instructions may be read into memory/storage 310 from another memory/storage 310 or from another device via communication interface 320. The instructions stored by memory/storage 310 may cause processor 305 to perform one or more processes described herein. Alternatively, for example, according to other implementations, device 300 may perform one or more processes described herein based on the execution of hardware (processor 305, etc.), the execution of firmware with hardware, or the execution of software and firmware with hardware.

Figure 4:
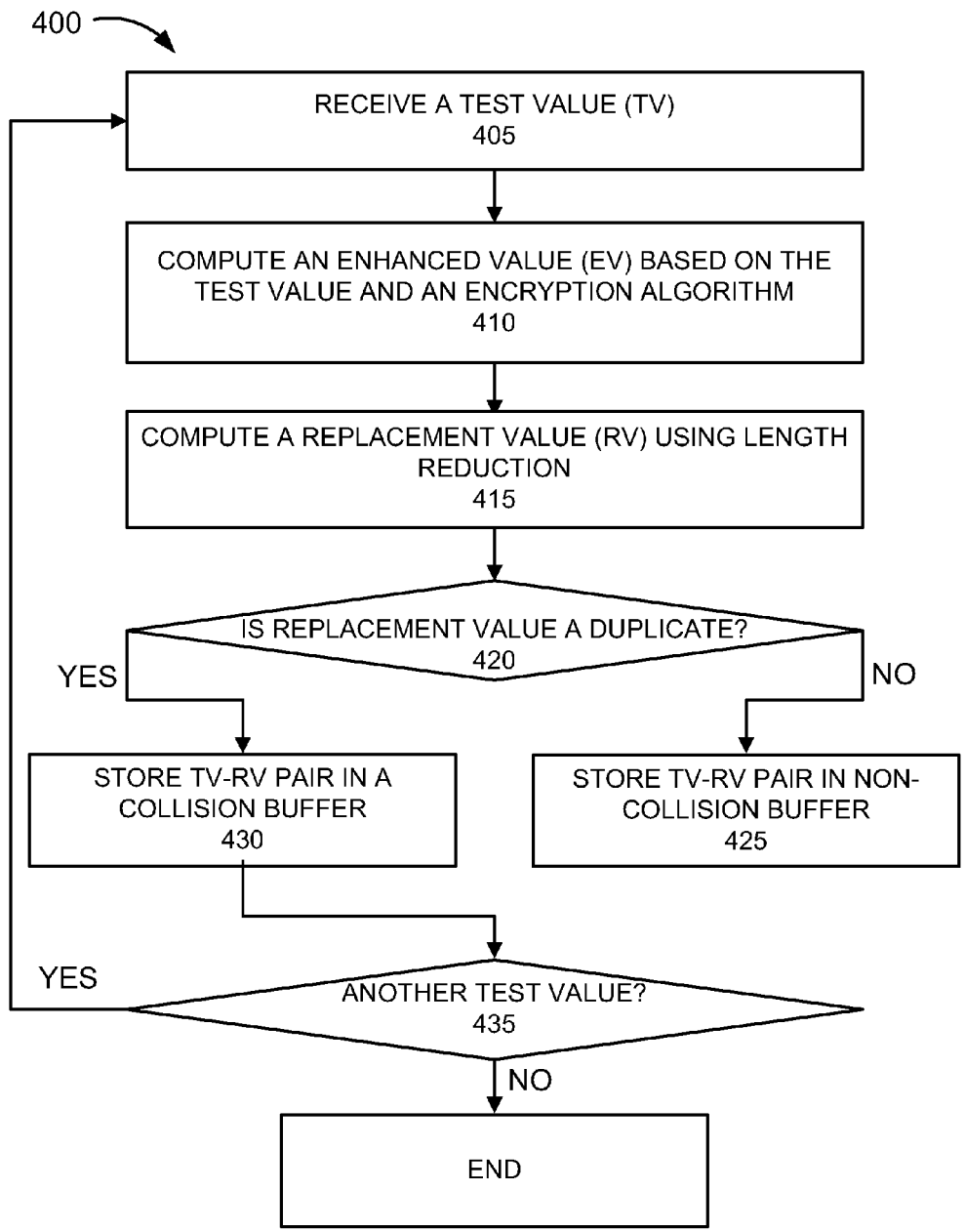
FIG. 4 is a flow diagram illustrating an exemplary process pertaining to an exemplary embodiment of detecting collisions between input data.

FIG. 4 is a flow diagram illustrating an exemplary process 400 pertaining to an exemplary embodiment of detecting collisions between test data. According to an exemplary embodiment, data masking device 115 performs process 400. For example, processor 305 may execute software 315 to perform the steps described.

Process 400 is described in relation to test data that includes numerical data. According to other scenarios, process 400 may be applied to other types of input data (e.g., alphabetic data, alphanumeric data, etc.), as previously described. For clarity sake, test value is synonymous with test data, enhanced value is synonymous with encrypted data, and replacement value is synonymous with replacement data.

Referring to FIG. 4, block 405, a test value is received. Preprocessing logic 220 of data masking device 115 receives a test value (TV). For example, assume that test data includes test values between 0 and 99999999.

In block 410, an enhanced value is computed based on the test value and an encryption algorithm. For example, preprocessing logic 220 encrypts the test value according to an encryption algorithm (e.g., an AES-256 encryption algorithm, etc.) to generate an enhanced value (EV). According to an exemplary embodiment, depending on the encryption algorithm used, the enhanced value may not only be different in length from the test value (e.g., the encrypted data may have a length greater than the test value, after encryption), but the enhanced value may also be converted into a different format. For example, if a numerical string is encrypted using the AES-256 encryption algorithm, the enhanced value may be converted into a hexadecimal value. According to an exemplary implementation, preprocessing logic 220 converts the hexadecimal value to a numerical format (e.g., a format that matches the test value).

In block 415, a replacement value using length reduction is computed. It is assumed that the length of the enhanced value is greater than the test value based on the encryption performed in block 410. Length reduction logic of preprocessing logic 220 is applied to the enhanced value. According to an exemplary embodiment, the enhanced value is tokenized (or parsed) into the number of digits equivalent to the test value. As previously described, length reduction logic may select a consecutive series of digits of the enhanced value or non-consecutive digits of the enhanced value to tokenize. Preprocessing logic 220 compares the tokenized enhanced value to the test value. If the tokenized enhanced value is different from the test value, preprocessing logic 220 selects the tokenized enhanced value as the replacement value. If the tokenized encrypted value is equivalent to the test value, the tokenize-and-compare process continues until a tokenized enhanced value that is different from the test value is obtained.

In block 420, it is determined whether the replacement value is a duplicate. For example, as previously described, preprocessing logic 220 compares the replacement value computed in block 415 to replacement value(s) stored in storage 250 (e.g., from previous iterations of process 400) that has/have not resulted in a collision. For example, test value and replacement values that do not result in a collision are stored in a non-collision buffer, as described in block 425.

If it is determined that the replacement value is not a duplicate (block 420—NO), then the test value, replacement value pair is stored in a non-collision buffer (block 425). For example, if preprocessing logic 220 determines that the replacement value is not already stored in the non-collision buffer (e.g., a buffer that stores non-collided test value, replacement value pairs), then preprocessing logic 220 stores the test value, replacement value pair in the non-collision buffer (e.g., storage 250).

If it is determined that the replacement value is a duplicate (block 420—YES), then the test value, replacement value pair is stored in a collision buffer (block 430). For example, if preprocessing logic 220 determines that the replacement value is already stored in the non-collision buffer (e.g., storage 250), then preprocessing logic 220 stores the test value, replacement value pair in the collision buffer (e.g., a buffer that stores collided test value, replacement value pairs), such as in storage 255.

In block 435, it is determined whether there is test value. For example, preprocessing logic 220 determines whether there is another test value to be preprocessed. If preprocessing logic 220 determines that there is another test value (block 435—YES), then process 400 continues to block 405. If preprocessing logic 220 determines that there is not another test value (block 435—NO), then process 400 ends.

Although FIG. 4 illustrates an exemplary process 400 to detect collisions between replacement values correlated to test values, process 400 may include additional operations, fewer operations, and/or different operations than those illustrated in FIG. 4 and described herein.

Figure 5A:
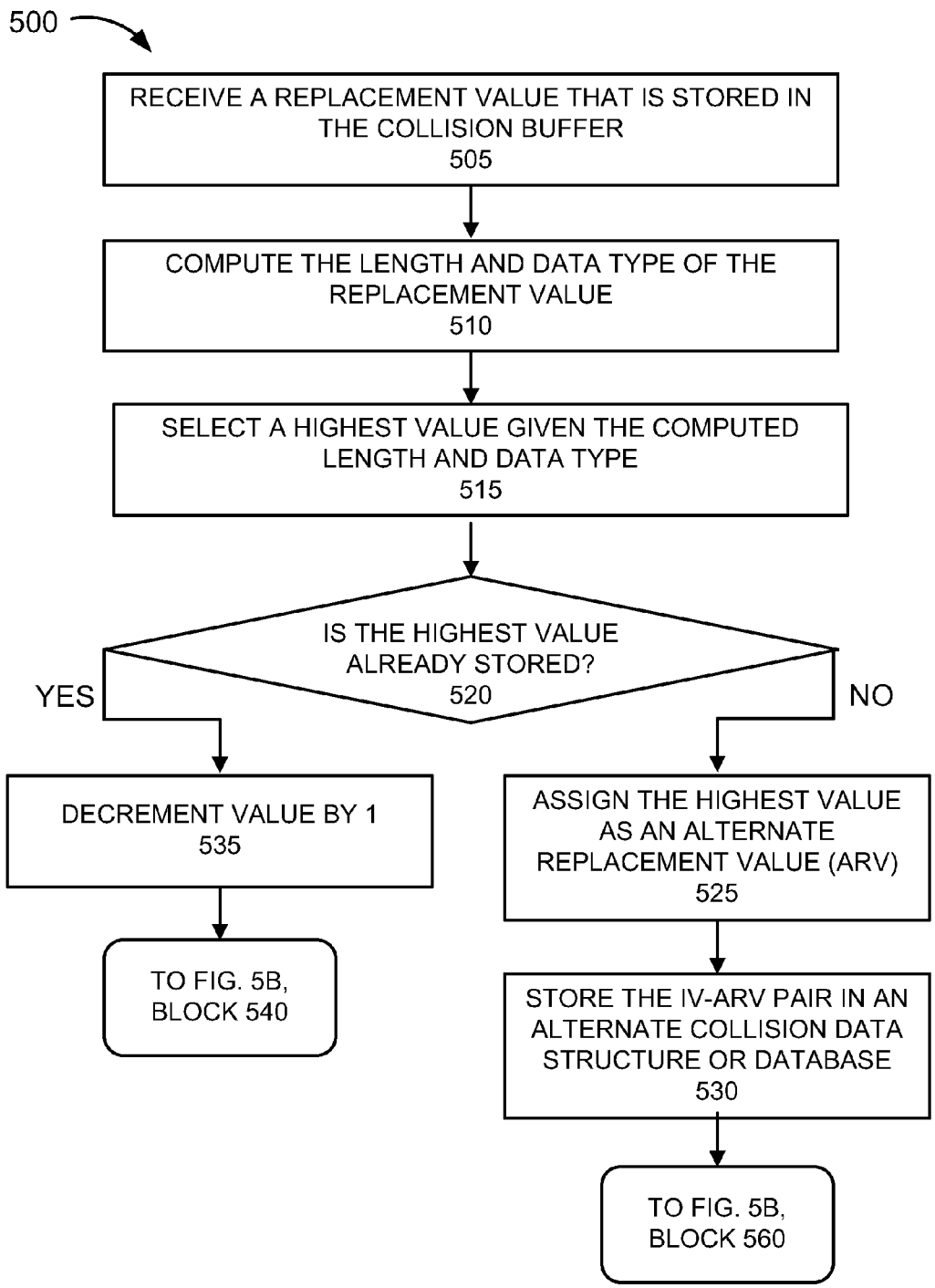
FIGS. 5A-5C are flow diagrams illustrating an exemplary process pertaining to an exemplary embodiment of generating alternate replacement data for collided input data.
Figure 5B:
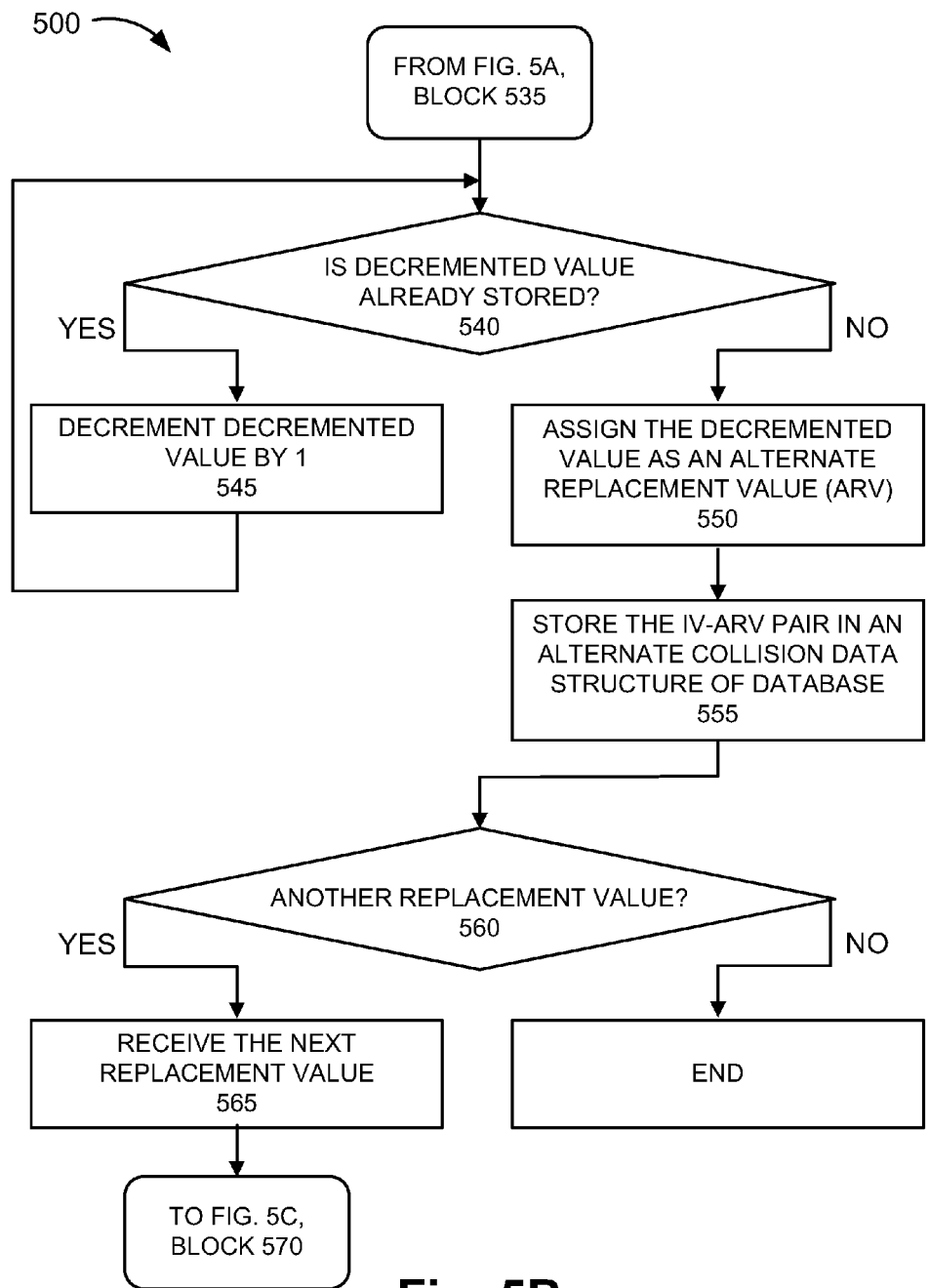
Figure 5C:
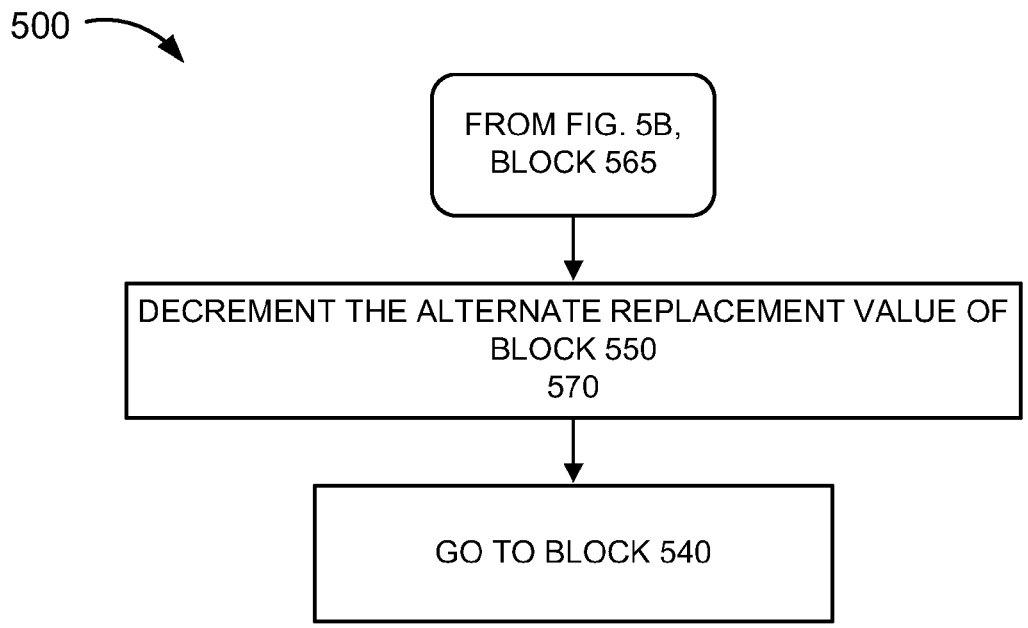

FIGS. 5A-5C are flow diagrams illustrating an exemplary process 500 pertaining to an exemplary embodiment of generating alternate replacement values for collided test value, replacement value pairs. According to an exemplary embodiment, data masking device 115 performs process 500. For example, processor 305 may execute software 315 to perform the steps described.

Process 500 is performed in continuation to process 400. Accordingly, process 500 is described in relation to a test value that includes numerical data. According to other scenarios, process 500 may be applied to other types of input data (e.g., alphabetic data, alphanumeric data, numerical data including special characters, etc.), as previously described.

Referring to FIG. 5A, in block 505, a replacement value that is stored in the collision buffer is received. For example, preprocessing logic 220 obtains a replacement value of a test value, replacement value pair stored in the collision buffer (e.g., stored in storage 255).

In block 510, the length of the replacement value is computed. For example, preprocessing logic 220 computes the number of digits of the replacement value. Preprocessing logic 220 also identifies the data type. According to this example, preprocessing logic 220 computes the length of the replacement value to be eight and the data type to be numerical.

In block 515, a highest value is selected based on the length of the replacement value. For example, preprocessing logic 220 selects an alternate replacement value having a highest value represented by the computed length and data type. For example, if the length of the replacement value is eight digits and the data type is numerical (e.g., in which each character has a value between 0-9) preprocessing logic 220 calculates that the highest value for a string of a length of eight digits is 99999999.

In block 520, it is determined whether the highest value is already stored in the non-collision buffer. For example, preprocessing logic 220 compares the highest value to the replacement values stored in the non-collision buffer (e.g., storage 250).

If it is determined that the highest value is already stored (block 520—YES), then the highest value is decremented by one (block 535). For example, if preprocessing logic 220 determines that the highest value is already stored in the non-collision buffer, preprocessing logic 220 decrements the highest value. For example, if the non-collision buffer already stores a replacement value equal to 99999999, preprocessing logic 220 decrements the highest value by one (e.g., 99999998). Process 500 continues to FIG. 5B, block 540, as described further below.

If it is determined that the highest value is not already stored (block 530—NO), then the highest value is assigned as an alternate replacement value (ARV) (block 525). For example, if preprocessing logic 220 determines that the highest value is not already stored in the non-collision buffer, preprocessing logic 220 assigns the highest value as an alternate replacement value for the correlated parsed input value.

In block 530, the test value, alternate replacement value pair is stored. For example, preprocessing logic 220 stores the test value, alternate replacement value pair in an alternate collision data structure or database (e.g., storage 235). Process 500 continues to FIG. 5B, block 560.

Referring to FIG. 5B, block 540, it is determined whether the decremented value is already stored. Preprocessing logic 220 determines whether the decremented value is already stored in the non-collision buffer (e.g., storage 255). For example, preprocessing logic 220 compares the decremented value (e.g., 99999998) to the replacement values stored in the non-collision buffer.

If it is determined that the decremented value is already stored (block 540—YES), then the decremented value is decremented (block 545). For example, if preprocessing logic 220 determines that the decremented value is already stored, preprocessing logic 220 decrements the decremented value. For example, preprocessing logic 220 decrements the value of 99999998 by one (e.g., 99999997) and process 500 continues to block 540, in this loop, until preprocessing logic 220 determines that a decremented value is not already stored in the non-collision buffer.

If it is determined that the decremented value is not already stored (block 545—NO), then the decremented value is assigned as the alternate replacement value (block 550). For example, preprocessing logic 220 assigns the decremented value as the alternate replacement value for the correlated test value.

In block 555, the test value, alternate replacement value pair is stored. For example, preprocessing logic 220 stores the test value, alternate replacement value pair in an alternate collision data structure or database (e.g., storage 260).

In block 560, it is determined whether another replacement value exists. For example, preprocessing logic 220 determines whether another replacement value exists in the collision buffer. If there is not another replacement value (block 560—NO), then process 500 ends. For example, preprocessing logic 220 deletes the data in the non-collision buffer and the collision buffer.

If there is another replacement value (block 560—YES), then the next replacement value is received (block 565). For example, preprocessing logic 220 selects a replacement value of a test value, replacement value pair stored in the collision buffer (e.g., storage 255).

Referring to FIG. 5C, block 570, the alternate replacement value of block 550 is decremented (FIG. 5C, block 570). For the example, preprocessing logic 220 decrements (e.g., by one) the decremented value assigned as an alternate replacement value in block 570. Process 500 continues to block 540 of FIG. 5B.

Although FIGS. 5A-5C illustrate an exemplary process 500 pertaining to generating alternate replacement values, process 500 may include additional operations, fewer operations, and/or different operations than those illustrated in FIGS. 5A-5C and described herein. For example, according to other implementations, alternate replacement values may be identified based on different operations. For example, replacement values stored in the non-collision buffer may be sorted and unused values or a unique series of characters may be identified (e.g., based on the range or possible values of test values) and assigned as alternate replacement values for replacement values stored in the collision buffer.

Figure 6:
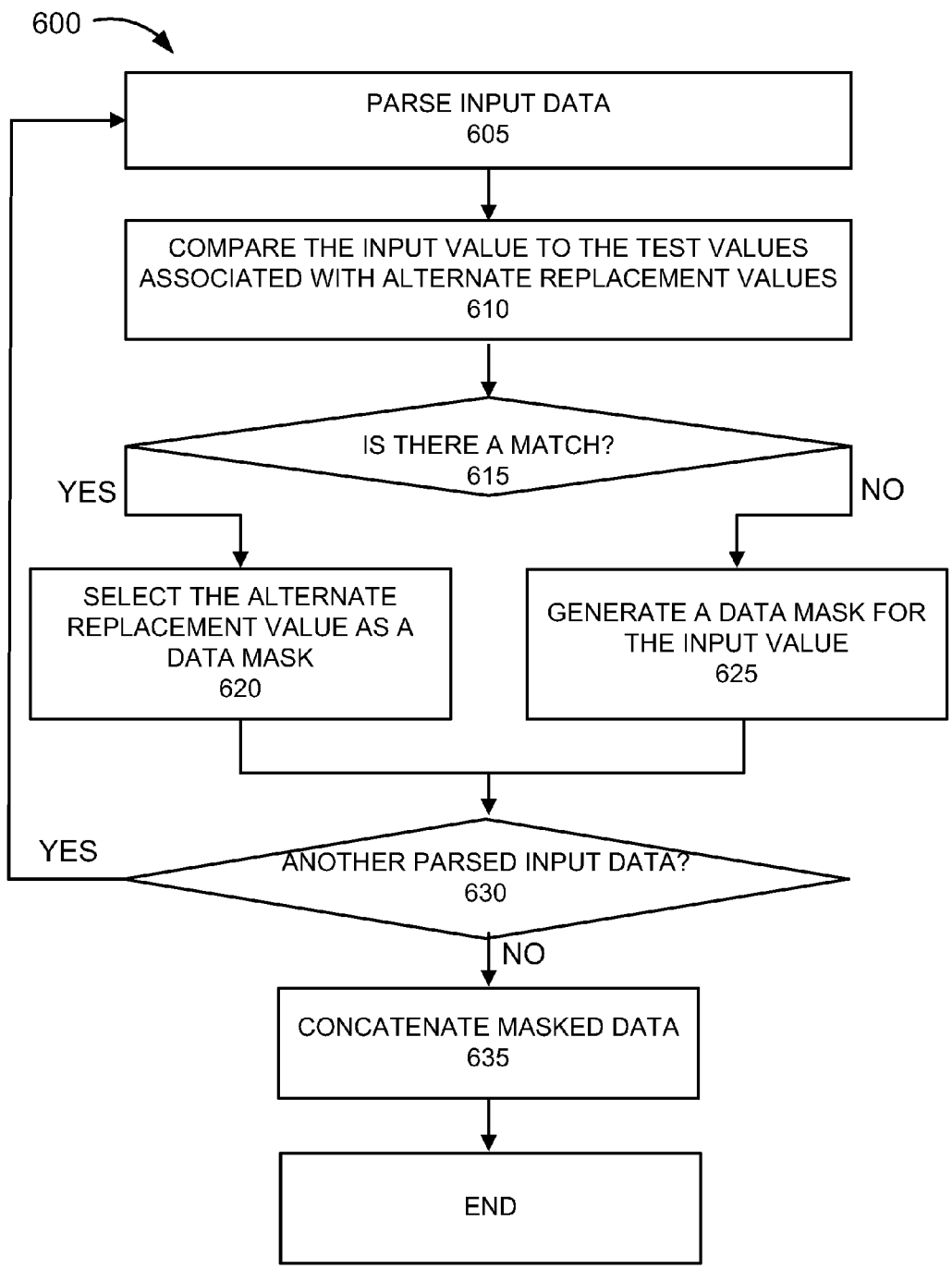
FIG. 6 is a flow diagram illustrating an exemplary process pertaining to an exemplary embodiment of data masking based on the alternate replacement data.

FIG. 6 is a flow diagram illustrating an exemplary process 600 pertaining to an exemplary embodiment of data masking based on the alternate replacement values. According to an exemplary embodiment, data masking device 115 performs process 600. For example, processor 305 may execute software 315 to perform the steps described. Process 600 may be performed when a data masking value is requested.

Referring to FIG. 6, block 605, input data is parsed. For example, processing logic 275 parses the input data into a particular length. According to this example, assume the input data is parsed into strings having a length of eight digits.

In block 610, the parsed input value is compared to test values associated with the alternate replacement values. For example, processing logic 275 compares the parsed input value to the test values stored in the alternate collision data structure or database (e.g., storage 260). Various search and detection methods may be implemented to improve speed and detection of whether a match exists. For example, the test values stored in the alternate collision data structure or database may be sorted to provide efficiency in detecting whether a match exists.

In block 615, it is determined whether the parsed input value matches any of the test values of the stored test value, alternate replacement value pairs. For example, processing logic 275 determines whether the parsed input value matches any of the test value(s) stored in the alternate collision data structure or database based on the comparison in block 610.

If it is determined that the parsed input value matches one of the test values of the stored test value, alternate replacement value pairs (block 615—YES), then the alternate replacement value is selected as a data masked value for that parsed input value (block 620). For example, processing logic 275 selects the alternate replacement value as the data masked value for that parsed input value. Process 600 continues to block 630, as further described below.

If it is determined that the parsed input value does not match one of the test values of the stored test value, alternate replacement value pairs (block 615—NO), then a data mask is generated for that parsed input value (block 625). For example, processing logic 275 encrypts the parsed input value using an encryption algorithm (e.g., AES-256, etc.). The encrypted value is then reduced by length reduction logic, etc., as previously described.

In block 630, it is determined whether there is another parsed input value. For example, if it is determined that there is another input data, then process 600 continues to block 605. If it is determined that there is not another input value, then the masked data is concatenated. For example, processing logic 275 concatenates the corresponding masked data to so as to generate masked data having a length of the input data before parsing. Process 600 ends.

Although FIG. 6 illustrates an exemplary process 600 for data masking, process 600 may include additional operations, fewer operations, and/or different operations than those illustrated in FIG. 6 and described herein. For example, special characters may be removed and inserted into masked data based on position information and special character information.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4, 5A-5C, and 6, the order of the blocks may be modified according to other embodiments. For example, depending on the original length of the input data, the step of parsing the data may be omitted. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.), a combination of hardware and software (e.g., software 315), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
    receiving test data including multiple test strings;
    encrypting each of the test strings;
    selecting, for each encrypted test string, a portion of the encrypted test string, wherein the portion of the encrypted test string has a predetermined length equal to a length of a corresponding test string;
    comparing, for each portion of the encrypted test string, the portion of the encrypted test string to the corresponding test string;
    determining, for each portion of the encrypted test string, whether the portion of the encrypted test string is equivalent to the corresponding test string;
    assigning, for each portion of the encrypted test string, the portion of the encrypted test string as a replacement string for the corresponding test string based on determining that the portion of the encrypted test string is not equivalent to the corresponding test string;
    determining, for each replacement string, whether each replacement string is unique relative to other replacement strings;
    storing each replacement string that is determined to be unique;
    storing each replacement string that is determined not to be unique;
    generating, for each replacement string determined not to be unique, an alternate replacement string;
    storing each alternate replacement string and corresponding test string; and
    outputting an alternate replacement string, of the stored alternate replacement strings, as a masked string in response to a determination that an input string matches a stored test string corresponding to the alternate replacement string.

2. The method of claim 1, further comprising:
    selecting, for each encrypted test string, another portion of the encrypted test string, based on determining that the portion of the encrypted test string is equivalent to the corresponding test string, wherein the other portion of the encrypted test string has the predetermined length.

3. The method of claim 1, wherein the generating, for each replacement string determined not to be unique, an alternate replacement string comprises:
    selecting the alternate replacement string based on each replacement string that is determined to be unique.

4. The method of claim 1, further comprising:
    deleting each replacement string that is determined to be unique; and
    deleting each replacement string that is determined not to be unique.

5. The method of claim 1, further comprising:
    receiving a request for a masked string pertaining to the input string;
    determining that the input string does not match any of the stored test strings associated with the alternate replacement strings; and calculating the masked string in response to determining that the input string does not match any of the stored test strings associated with the alternate replacement strings.

6. The method of claim 5, wherein the calculating comprises:
encrypting the input string;
selecting a portion of the encrypted input string; and
assigning the portion of the encrypted input string as the masked string.

7. The method of claim 1, wherein the input string includes one of numerical data, alphabetic data, or alphanumeric data.

8. The method of claim 1, further comprising:
determining that the input string includes a special character; and
removing the special character from the input string based on determining that the input string includes the special character.

9. A device comprising:
a communication interface;
one or more memories that store instructions; and
one or more processors to execute the instructions to:
receive, via a communication interface, test strings;
encrypt each of the test strings;
select, for each encrypted test string, a portion of the encrypted test string, wherein the portion of the encrypted string has a predetermined length equal to a length of an input string or a parsed input string to be data masked;
compare each portion of the encrypted test string to the portion of the encrypted test string's corresponding test string;
determine, for each portion of the encrypted test string, whether the portion of the encrypted test string is equivalent to the corresponding test string;
assign, for each portion of the encrypted test string, the portion of the encrypted test string as a replacement string for the corresponding test string based on a determination that the portion of the encrypted test string is not equivalent to the corresponding test string;
determine, for each replacement string, whether each replacement string is unique relative to other replacement strings;
store each replacement string that is determined to be unique;
store each replacement string that is determined not to be unique;
generate, for each replacement string determined not to be unique, an alternate replacement string;
store each alternate replacement string and each corresponding test string; and
transmit, via the communication interface, an alternate replacement string, of the stored alternate replacement strings, as a masked string in response to a determination that the input string matches a test string corresponding to the alternate replacement string.

10. The device of claim 9, wherein the one or more processors further execute the instructions to:
select, for each encrypted test string, another portion of the encrypted test string, based on a determination that the portion of the encrypted test string is equivalent to the corresponding test string, wherein the other portion of the encrypted test string has the predetermined length.

11. The device of claim 10, wherein, when selecting, for each encrypted test string, the other portion of the encrypted string, the one or more processors further execute the instructions to:
select the other portion of the encrypted test string based on a right-shift of one position from a starting position associated with the portion of the encrypted test string.

12. The device of claim 9, wherein the one or more processors further execute the instructions to:
receive, via the communication interface, a request for a masked string pertaining to the input string;
determine that the input string does not match any of the test strings associated with the alternate replacement strings; and
calculate the masked string in response to the determination that the input string does not match any of the test strings associated with the alternate replacement strings.

13. The device of claim 12, wherein, when calculating, the one or more processors further execute the instructions to:
encrypt the input string;
select a portion of the encrypted input string having a length equivalent to the predetermined length; and
assign the portion of the encrypted input string as the masked string.

14. The device of claim 9, wherein each of the test strings include one of numerical data, alphabetic data, or alphanumeric data, and wherein the test strings have values corresponding to all possible values associated with any input string to be data masked.

15. The device of claim 9, wherein the one or more processors further execute the instructions to:
determine that the input string includes a special character;
remove the special character from the input string based on the determination that the input string includes the special character; and
reinsert the special character in the masked string.

16. The device of claim 9, wherein, when generating, for each replacement string determined not to be unique, the alternate replacement string, the one or more processors further execute the instructions to:
select the alternate replacement string based on each replacement string that is determined to be unique.

17. A non-transitory storage medium storing instructions executable by a computational device, wherein the instructions comprise instructions to:
receive test data including multiple test strings, wherein the test data is a data set that includes all possible values of input strings to be data masked;
encrypt each of the test strings;
select, for each encrypted test string, a portion of the encrypted test string that has a length equal to a length of a corresponding test string;
compare each portion of the encrypted test string to the portion of the encrypted test string's corresponding test string;
determine, for each portion of the encrypted test string, whether the portion of the encrypted test string is equivalent to the corresponding test string;
assign, for each portion of the encrypted test string, the portion of the encrypted test string as a replacement string for the corresponding test string based on a determination that the portion of the encrypted string is not equivalent to the corresponding test string;
determine, for each replacement string, whether each replacement string is unique relative to other replacement strings;

store each replacement string that is determined to be unique;

store each replacement string that is determined not to be unique;

generate, for each replacement string determined not to be unique, an alternate replacement string;

store each alternate replacement string and corresponding test string; and output an alternate replacement string, of the stored alternate replacement strings, as a masked string in response to a determination that an input string, of the input strings to be data masked, matches a stored test string corresponding to the alternate replacement string.

18. The non-transitory storage medium of claim 17, wherein the instructions comprise instructions to:

select, for each encrypted test string, another portion of the encrypted test string, based on a determination that the portion of the encrypted test string is equivalent to the corresponding test string, wherein the other portion of the encrypted test string has the length.

19. The non-transitory storage medium of claim 17, wherein the instructions comprise instructions to:

generate a masked string in response to a determination that the input string does not match any test string of the test strings associated with the alternate replacement strings.

20. The non-transitory storage medium of claim 19, wherein, when generating the masked string, the instructions comprise instructions to:

encrypt the input string; and select a portion of an encrypted input string having the predetermined length.

* * * * *